United States Patent [19]

Brouwer

[11] 3,839,674

[45] Oct. 1, 1974

[54] DEVICE FOR MEASURING VERY SMALL ELECTRIC CURRENTS

[75] Inventor: Geert Brouwer, Emmasingel, Eindhoven, Netherlands

[73] Assignee: U.S. Philips Corporation, New York, N.Y.

[22] Filed: June 6, 1973

[21] Appl. No.: 367,545

Related U.S. Application Data

[63] Continuation of Ser. No. 156,354, June 24, 1971, abandoned.

[52] U.S. Cl............ 324/123 R, 324/72.5, 324/120
[51] Int. Cl......................... G01r 1/30, G01r 19/26
[58] Field of Search .......... 324/123, 72.5, 109, 121, 324/120; 313/105; 250/207

[56] References Cited
UNITED STATES PATENTS

| | | | |
|---|---|---|---|
| 1,962,873 | 6/1934 | Parker | 324/121 R |
| 2,200,063 | 5/1940 | Heising | 313/105 |
| 2,205,071 | 6/1940 | Skellett | 313/105 |
| 2,397,822 | 4/1946 | van den Bosch | 313/105 |
| 2,412,423 | 10/1946 | Rajchman et al. | 250/207 |
| 2,454,871 | 11/1948 | Gunderson | 250/207 |
| 2,473,031 | 6/1949 | Larson | 313/105 |
| 2,570,665 | 10/1951 | Gunderson | 250/207 |
| 2,772,368 | 11/1956 | Scherbatskoy | 313/105 |

Primary Examiner—Alfred E. Smith
Attorney, Agent, or Firm—Frank R. Trifari

[57] ABSTRACT

Apparatus for measuring an electric current of the order of magnitude of $10^{-13}$ amps and smaller which comprises an evacuated envelope having a cathode and a control electrode for converting the current into a flow of distinct electrons proportional to the current, and an electron multiplier and anode for converting each distinct electron into a pulse for measurement. The apparatus may also have a positive feedback circuit to increase the speed of response.

4 Claims, 8 Drawing Figures

INVENTOR.
GEERT BROUWER

INVENTOR.
GEERT BROUWER

DEVICE FOR MEASURING VERY SMALL ELECTRIC CURRENTS

This is a continuation, of application Ser. No. 156,354, now abandoned, filed June 24, 1971.

The invention relates to a device for measuring an electric current.

The invention relates in particular to a device for measuring very small currents of the order of magnitude of $10^{-13}$ A and smaller. For measuring such small current strengths, a so-called electrometer is often used. This instrument has the drawback, however, of a small zero-point stability. If the current to be measured is formed by a beam of charged particles, for example electrons in a vacuum, an electron multiplier may also be used. The drawback of a multiplier is that its dimensions are too large for some applications. This latter is the case, for example in a mass spectrometer in which a beam of ions is separated according to the ratio of their charge and mass. The minimum distance between collector electrodes for simultaneously receiving ions having different ratios of their charge and mass then depends upon the dimensions of the electron multipliers.

It is the object of the invention to provide a device with which a very small current flowing in a conductor can be measured with a very good zero-point stability.

According to the invention, a device for measuring an electric current comprises an evacuated envelope having a cathode, a control electrode and an electron multiplier and the current to be measured flows in a circuit which is connected in series with the cathode and the control electrode.

The invention is based on the recognition of the fact that the large signal-to-noise ratio and amplification factor of an electron multiplier may advantageously be used if one succeeds in converting the current to be measured and flowing in a conductor into a flow of electrons corresponding therewith in a vacuum, which electrons impinge upon the electron multiplier with a sufficient energy to release secondary electrons. For that purpose the invention provides a cathode and a control electrode which latter may be constructed, for example, as a grid. The current which flows in the diode which is constituted by the cathode and the control electrode, is determined by the current to be measured which flows in a circuit which is connected in series with the said diode. The voltage across the diode adjusts automatically at the correct value, since a current source supplies a current which is determined by said source independently of the external load. In this case it is assumed that the cathode is capable of supplying sufficient electrons, which is the case already at room temperature for certain cathode materials due to the small current intensity to be measured. A fixed fraction of the current supplied by the cathode passes the control electrode and is supplied to the electron multiplier which ensures the amplification. In this manner one electron already can give a pulse to be distinguished at the output of the electron multiplier.

A device according to the invention preferably comprises a feedback circuit to increase the speed of response to the device, which feedback circuit prevents the current to be measured from supplying charge variations of the capacity between the cathode and the control electrode, which variations are the result of variations of the current to be measured.

In order to increase the speed of response, i.e., the speed at which the device reacts to variations of the current intensity to be measured, or, as is sometimes said, in order to increase the bandwidth, negative feedback coupling is a known measure. This aspect of the invention is based on the recognition of the fact that variations in the current intensity, with a fixed relation between voltage and current in the diode constituted by the cathode and the control electrode, results in variations in the voltage between the cathode and the control electrode. This has for its result that the current to be measured must charge the capacity between the cathode and the control electrode. Although this capacity is only small, extremely long time constants occur nevertheless since only very small currents are measured. By ensuring by means of a negative feedback circuit that the current to be measured need not supply any charge, a very rapid response can be obtained.

A favourable embodiment of the device according to the invention is such that the cathode is a photoelectric cathode and the feedback circuit comprises a source of photons having an intensity which is substantially proportional to the intensity of the current to be measured.

In this manner the emission of the cathode is made proportional to the current to be measured, as a result of which the voltage between the cathode and the control electrode remains constant. It is therefore not necessary for the capacity between the cathode and the control electrode to be charged or discharged, except when the device is switched on.

Another favourable embodiment of a device according to the invention is such that the device comprises an auxiliary electrode opposite to the side of the cathode remote from the control electrode, said auxiliary electrode being provided by the feedback circuit with a voltage relative to the control electrode which is substantially logarithmically dependent upon the current to be measured. In this manner the charge of the capacity between the auxiliary electrode and the control electrode in the region between the cathode and the control electrode causes the field strength which is necessary to cause the cathode to emit a current which is equal to the current to be measured. The charge required for this purpose is supplied by the feedback circuit and not by the current to be measured and can consequently be supplied rapidly. The field strength to be made by the feedback circuit must be dependent logarithmically upon the current to be measured in connection with the logarithmic characteristic of a diode in a so-called range of the starting current.

A likewise favourable embodiment of a device according to the invention is such that the feedback circuit provides the cathode with a voltage relative to the input of the electron multiplier which depends substantially logarithmically upon the current to be measured.

This embodiment is in principle the same as the previous embodiment but specially suitable for measuring currents of current sources the so-called floating terminal of which can be connected to the control electrode. In that case the auxiliary electrode must be available on the side of the control electrode remote from the cathode, for which purpose the input of the electron multiplier may advantageously be used.

A device for measuring an electric current according to the invention may advantageously be constructed so as to comprise a substantially evacuated envelope having a cathode, a control electrode and an electron multiplier having a number of dynodes, the current to be measured flowing in a circuit which is connected in series with one of the dynodes.

In this manner a larger current strength can also be measured with such a device as a result of which the device becomes more universally applicable. Actually, the amplification of an electron multiplier depends upon the number of dynodes which is operative for multiplying the current to be measured.

A very advantageous embodiment of a device according to the invention is such that the device comprises a photomultiplier tube having a number of dynodes, the first dynode of which is connected as the control electrode.

In this manner an already known and suitably chosen photo-multiplier tube may be used for a device according to the invention.

In order that the invention may be readily carried into effect, it will now be described in greater detail, by way of example, with reference to the accompanying drawings, in which each of the Figures shows a possible construction of a device according to the invention. Corresponding components in the Figures are referred to by the same reference numerals.

A brief description of the drawings is as follows.

Figure 1:
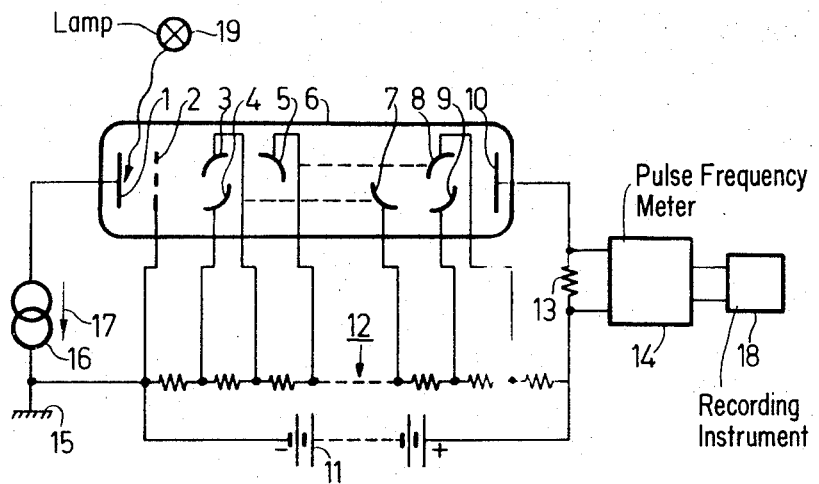
FIG. 1 is a schematic diagram in accordance with the invention of a device for measuring very small currents with grounded control electrode.

Referring now to FIG. 1, reference numeral 6 denotes an evacuated envelope having a cathode 1, a control electrode 2 and a number of dynodes which are not shown all of them. Those dynodes shown are referred to by reference numerals 3, 4, 5, 7, 8 and 9. The envelope 6 furthermore comprises an anode 10. A voltage source 11 and a potentiometer 12 supply voltage to the said electrodes.

Electrons emitted by the cathode 1 and passing the control electrode 2 impinge upon the first dynode 4. Like the other dynodes, the dynode 4 has an area the secondary emission coefficient of which at the applied voltage is larger than 1. The current amplified and emitted by the dynode 4 is received by the second dynode 3. In this manner the current is amplified stepwise and ultimately received by the anode 10.

A current source 16 having a direction of the current which is denoted by an arrow 17 is connected between the cathode 1 and the control electrode 2, which is connected to earth at 15. Current pulses received by the anode 10 flow through a resistor 13. Voltage pulses produced across the resistor 13 are handled in a pulse frequency meter 14, which supplies an output signal which indicates the measured value of the current on an indicator or recording instrument 18. A source of radiation 19 supplies energy to the cathode 1. The cathode 1 is a cesium antimony photocathode. Without exposure and at room temperature, it can emit approximately $10^4$ electrons per second and per $cm^2$, so approximately $1.6 \times 10^{15} A/cm^2$. If this current is emitted indeed, the cathode thus supplies the so-called saturation current. The source of radiation 19 thus need not be present for measuring very small currents. For measuring currents at which the cathode is to emit more electrons, reference numeral 19 is a source of photons which increases the emission of the cathode by the photo-electric effect.

The cathode 1 and the control electrode 2 constitute a diode which is operative in the so-called range of the starting current. The current through the diode is determined by the current source 16. The current-voltage characteristic of the diode thus determines the voltage between the cathode 1 and the control electrode 2. An excess of emitted electrons reduces the voltage of the control electrode 2 with respect to cathode 1, as a result of which the current emitted by the cathode 1 reduces until it is equal to the current of the current source 16. A fixed fraction of the emitted electrons passes the control electrode 2 and impinges on the first dynode 4. This has for its result that a fixed fraction of approximately 99 percent of the electrons flowing through the current source 16 are each multiplied by the dynodes 3, 4, 5, 7, 8 and 9. Thus each electron of the measure current causes a separate voltage pulse to be formed across the resistor 13. The frequency of the voltage pulses is measured with the pulse frequency meter 14 and is indicated on the instrument 18. The pulse frequency is thus equal to the number of electrons in the measured current and is a measure of the current strength of the current source 16.

Figure 2:
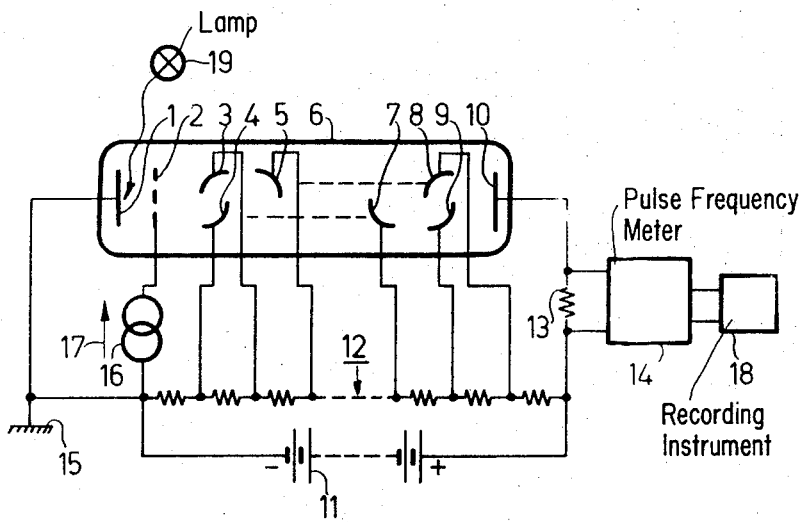
FIG. 2 is another schematic diagram of a device in accordance with the invention for measuring very small currents with grounded cathode.

FIG. 2 shows a corresponding circuit arrangement for a current source 16 which is connected to earth on the other side (15).

Figure 3:
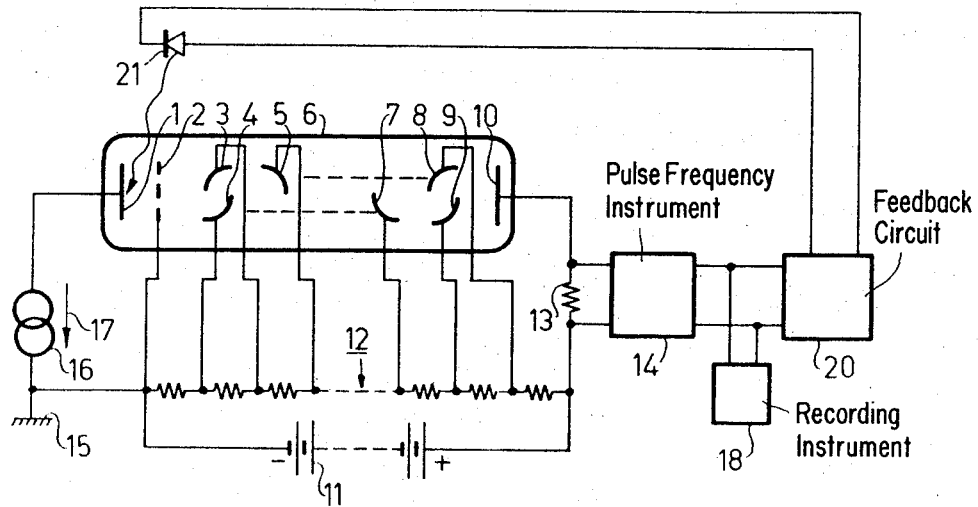
FIG. 3 is a further schematic diagram of a device in accordance with the invention for measuring very small currents with feedback via a light path.

FIG. 3 shows a circuit arrangement which is based on the circuit arrangement shown in FIG. 1, but also comprises a feedback circuit consisting of a circuit arrangement 20 and a gallium-phosphide semi-conductor diode 21. With a current of 1 mA, the diode 21 is capable of emitting approximately $10^{13}$ photons per second. The cathode 1 is a photoelectric cathode the emission of which in this circuit arrangement is substantially entirely photoelectric. The thermal emission may be neglected relative to the photoelectric emission. In order to achieve that the electrons released by the photons are substantially in a thermal equilibrium, only photons having an energy which corresponds substantially to the emanating potential of the cathode are passed by a filter. In the circuit arrangement chosen by way of example, they are photons having a spreading of 0.025 eV around the 1 eV. The number of photons which the diode 21 emits is made proportional to the measured current strength by means of the circuit arrangement 20. The current-voltage characteristic of the diode constituted by the cathode 1 and the control electrode 2 may be written as $I = I_o \exp (U/U_T)$, where I is the current through the diode, U the voltage across the diode, $I_o$ the current at $U = O$ and $eU_T$ is the thermal energy of an electron at an absolute temperature. (e is the absolute value of the charge of one electron). By the feedback circuit, $I_o$ is made proportional to I in the manner already described, which implies that at any value of I the voltage U remains the same. The charge of the capacity between the cathode 1 and the control electrode 2 thus remains constant, that is to say that the current to be measured need not supply variations in charge, so that a rapid response is obtained.

From the following calculation is appears that a large time constant is formed without feedback circuit. Let it be assumed that a constant current $I_1$ of $10^3$ electrons per second is suddenly reduced to $10^2$ electrons per second ($I_2$) and that the capacity C between the cathode 1 and the control electrode 2 has a value of 5 pF. From the above formula it follows that $U_1 - U_2 = U_T \ln (I_1/I_2)$. At room temperature and with only thermal emission, $U_T$ is approximately 0.023 V. $I_1/I_2 = 10$. From this it follows that $U_1 - U_2$ is approximately 0.060 volts. The required charge variation of T therefore is $C \times (U_1 - U_2)$ or approximately $3 \times 10^{-13}$ coulomb. For this purpose, a current difference of $9.10^2$ electrons per second is available at the beginning, which makes the time constant larger than $2 \times 10^{-3}$ seconds.

Figure 4:
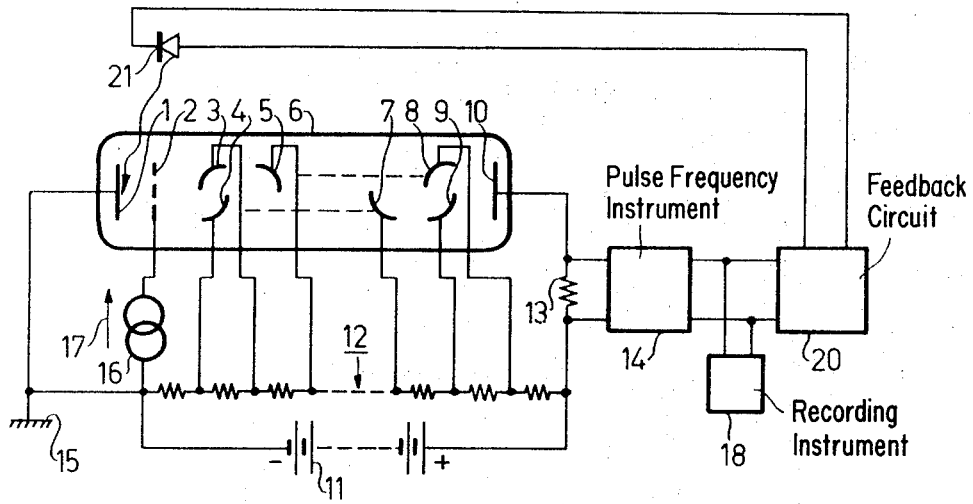
FIG. 4 is an alternate schematic diagram of another device in accordance with the invention for measuring very small currents with feedback via a light path.

FIG. 4 shows a circuit arrangement which is based on the circuit arrangement shown in FIG. 2 but is provided with a feedback circuit in the same manner as in FIG. 3.

Figure 5:
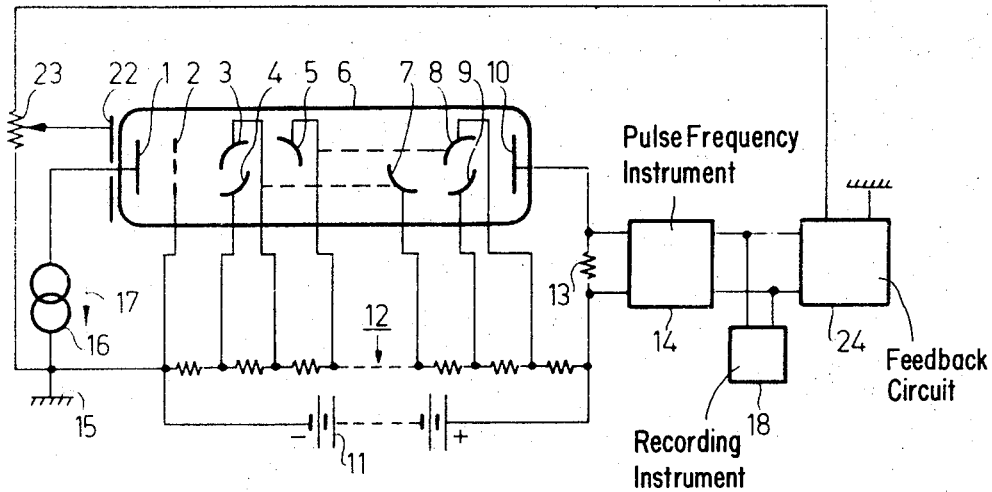
FIG. 5 is another schematic diagram of a device in accordance with the invention for measuring very small currents with feedback via an induced electric field.

FIG. 5 shows an alternative solution for a feedback circuit. An auxiliary electrode 22 is provided which consists of a vapour-deposited layer on the outside of the envelope 6 which is provided, by means of a potentiometer 23 and a circuit arrangement 24, with a voltage which depends logarithmically on the measured current, so is proportional to log (I). Variations in the charge of the auxiliary electrode 22 thus give field variations proportional thereto between the cathode 1 and the control electrode 2, but without net variations in the charge of the cathode 1. As a result of this the voltage between the cathode 1 and the control electrode 2 may vary so as to satisfy the already given relation $I = I_o \exp (U/U_T)$, where in this case exp(U) is proportional to I without it being necessary for the current source 16 to supply variations in the charge of the cathode 1. The result of this is rapid response of the circuit arrangement.

Figure 6:
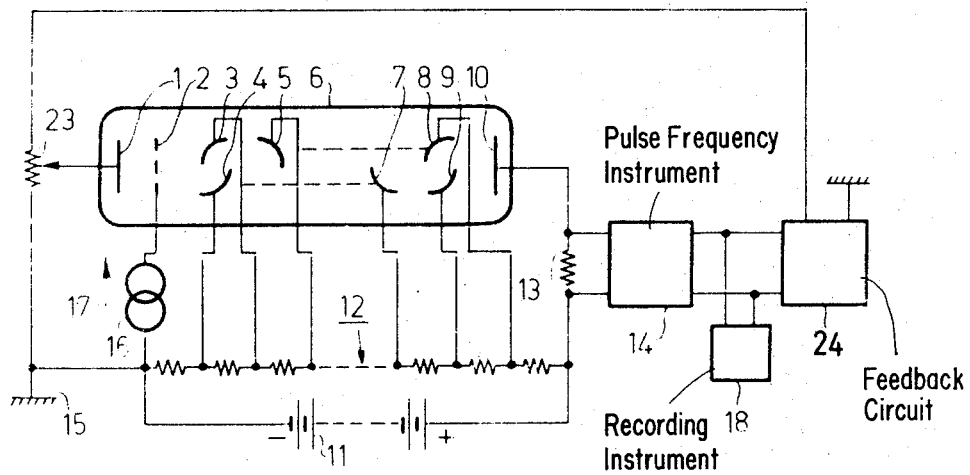
FIG. 6 is a schematic diagram of another embodiment in accordance with the invention for measuring very small currents with feedback via an induced electric field.

FIG. 6 shows a circuit arrangement which is based on the circuit arrangement of FIG. 2 and comprises a feedback coupling which in principle is equal to that shown in FIG. 5. Since in the circuit arrangement shown in FIG. 6 the floating terminal of the current source 16 is connected to the control electrode 2, it must be prevented by means of a feedback coupling that the current source 16 is to supply variations in the charge of the control electrode 2. Applying the principle underlying the circuit arrangement shown in FIG. 5, an auxiliary electrode should now be present on the side of the control electrode 2 remote from the cathode 1. For this purpose the first dynode 4 may advantageously be used. Since the dynode 4 should have a constant voltage, a voltage is supplied to the cathode 1 by the circuit arrangement 24 and the potentiometer 23, which voltage depends logarithmically on the measured current, thus is proportional to log (I). Variations in the charge of the cathode 1 produce field variations proportional thereto between the cathode 1 and the control electrode 2, but without net variations in the charge of the control electrode 2. As a result of this the voltage between the cathode 1 and the control electrode 2 may vary so as to satisfy the already given relation $I = I_o \exp (U/U_T)$, where in this case exp (U) is proportional to I, without it being necessary for the current source 16 to supply variations in the charge of the control electrode 2. This results in a rapid response of the circuit arrangement.

Figure 7:
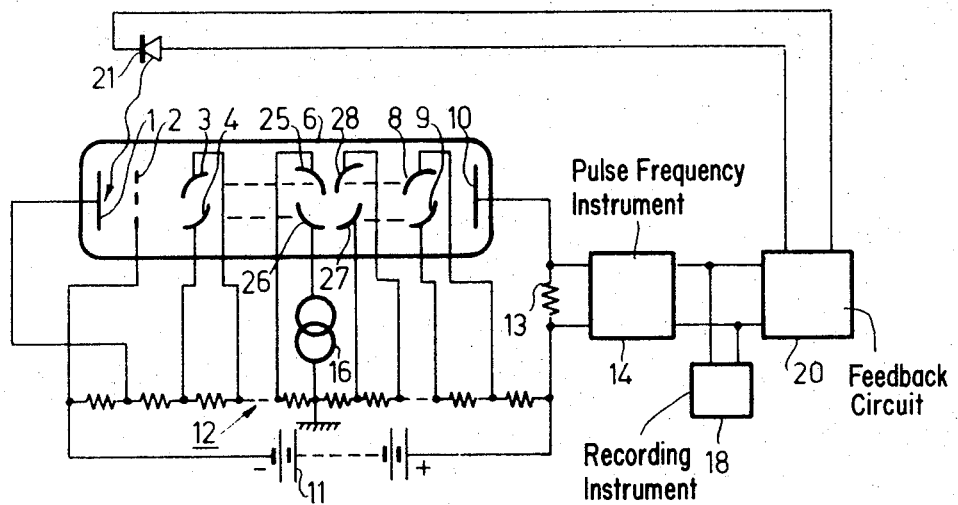
FIG. 7 is still another schematic diagram of a device in accordance with the invention for measuring very small currents with the floating terminal of the current source connected to a dynode of an electron multiplier.

FIG. 7 shows a circuit arrangement for measuring the current of a current source which is so large that the overall amplification of the electron multiplier is not necessary. The floating terminal of the current source 16 is connected to the dynode 26. The difference in current between the primary electron current which impinges upon the dynode 26 and the electron current emitted secondarily by said dynode is supplied by the current source 16. The voltage of the dynode 26 thus adjusts so that the (voltage-dependent) secondary emission factor has the required value. In order to prevent the current source 16 from supplying variations in the charge of the dynode 26 in the case of current variations, and in order to obtain a linear response of the circuit arrangement, a feedback circuit is used which makes the primary current which impinges upon the dynode 26 proportional to the measured current strength.

Figure 8:
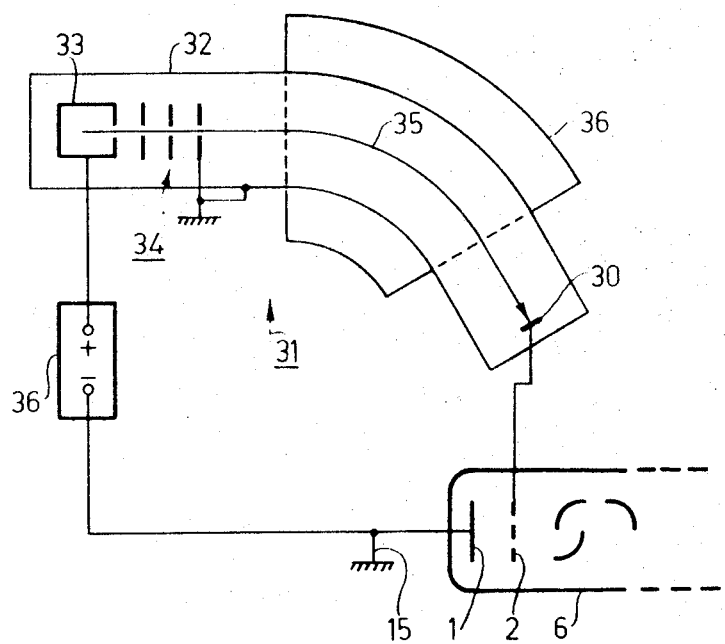
FIG. 8 is a schematic diagram of an application of a device in accordance with the invention for measuring very small currents in a mass spectrometer.

In FIG. 8 it is shown how the circuit arrangement of FIG. 4 is to be used for measuring the current which is received by a collector electrode 30 of a mass spectrometer 31. In this Figure the circuit arrangement shown in FIG. 4 is repeated only in so far as it is necessary to indicate the connections between the mass spectrometer and the device according to the invention. The mass spectrometer 31 comprises an evacuated envelope 32 having an ion source 33 which is shown diagrammatically. The ion source 33 in which gas is ionized is at a positive potential of a few kV relative to earth. This voltage is supplied by the supply 36. Positive ions are extracted from the ion source 33 by the accelerating electrodes 34, the last of which has earth potential. The formed tape-shaped beam the axis of which is denoted by 35 passes a sector-shaped magnetic field which is shown diagrammatically by 36 and ions having a certain ratio of their charge and mass are received by the collector electrode 30. This collector electrode is elongate having its longitudinal direction perpendicular to the plane of the drawing, and narrow in the direction in which the beam is deflected by the magnetic field. The current source which in FIGS. 1 to 7 is denoted by 16 has in this example a floating terminal which is constituted by the collector electrode 30 and an earth terminal which is constituted by the negative connection of the supply 36. The voltage between the cathode 1 and the control electrode 2 is negligible relative to the voltage of the supply 36, so that the current strength of the ion beam is not influenced by the measurement. So the current of a current source is measured indeed.

It is to be noted that for a device according to the invention a known photomultiplier tube may advantageously be used which comprises a number of dynodes. It is then possible to connect the first dynode as the control electrode.

It is furthermore to be noted that a device according to the invention is not restricted to the use of an electron multiplier having dynodes, but that a suitably chosen so-called channel-electron multiplier may also be used very readily.

The use of the device is, of course, not restricted to the measurement of current of a mass spectrometer. The device can be used in all those cases in which very small currents are to be measured, for example, also in dosimeters.

What is claimed is:

1. Apparatus for measuring a small direct electric current, comprising:

an evacuated envelope having an electron multiplier, a cathode for emitting electrons toward said electron multiplier, a control electrode positioned between said electron multiplier and said cathode to receive a fraction of the electrons emitted by said cathode toward said electron multiplier and to allow a fraction thereof to pass on to said electron multiplier, and an anode for receiving electrons emerging from said electron multiplier;

means for connecting a source of very small direct electric current in series with said cathode and control electrode, for causing thereby a flow of individually distinct electrons passed by said control electrode, which flow is proportional to the direct current of the connected source, each of the distinct electrons being multiplied by said electron multiplier into a pulse of electrons emerging therefrom to said anode; and pulse frequency measuring apparatus connected to said anode for measuring the frequency of pulses of electrons received by said anode, the frequency being a measure of the direct current of the connected source.

2. Apparatus as claimed in claim 1 and further comprising a feedback circuit to increase the speed of response, which feedback circuit prevents the current to be measured from supplying variations in the charge between said cathode and said control electrode, which variations are the result of variations of the current to be measured, said cathode being a photoelectric cathode and said feedback circuit comprising a source of photons directed toward said photoelectric cathode and having an intensity which is substantially proportional to the pulse frequency measured by said pulse frequency measuring apparatus.

3. Apparatus as claimed in claim 1 and further comprising a feedback circuit to increase the speed of response of the device, which feedback circuit prevents the current to be measured from supplying variations in the charge between said cathode and said control electrode, which variations are the result of variations of the current to be measured, said apparatus further comprising an auxiliary electrode opposite to the side of the cathode remote from the control electrode, said auxiliary electrode being provided by said feedback circuit with a voltage relative to the control electrode which depends substantially logarithmically upon the pulse frequency measured by said pulse frequency measuring apparatus.

4. Apparatus as claimed in claim 1, comprising a feedback circuit to increase the speed of response of the device, which feedback circuit prevents the current to be measured from supplying variations in the charge between said cathode and said control electrode, which variations are the result of variations of the current to be measured, said feedback circuit providing the cathode with a voltage relative to the input of the electron multiplier which depends substantially logarithmically upon the pulse frequency measured by said pulse frequency measuring apparatus.

* * * * *

UNITED STATES PATENT AND TRADEMARK OFFICE
CERTIFICATE OF CORRECTION

PATENT NO. : 3,839,674
DATED : October 1, 1974
INVENTOR(S) : GEERT BROUWER

It is certified that error appears in the above-identified patent and that said Letters Patent are hereby corrected as shown below:

On the title page, after Section [63], insert the following:

--[30]   Foreign Application Priority Data
        July 4, 1970    Netherlands............7009931--

Signed and Sealed this

Tenth Day of May 1977

[SEAL]

Attest:

RUTH C. MASON
Attesting Officer

C. MARSHALL DANN
Commissioner of Patents and Trademarks